(12) United States Patent  (10) Patent No.: US 8,056,852 B1
Dizdarevic et al.  (45) Date of Patent: Nov. 15, 2011

(54) LONGITUDINAL FLYING WING AIRCRAFT

(76) Inventors: Faruk Dizdarevic, Anaheim, CA (US);
Mithad Dizdarevic, Anaheim, CA (US)

( * ) Notice: Subject to any disclaimer, the term of this patent is extended or adjusted under 35 U.S.C. 154(b) by 0 days.

(21) Appl. No.: 13/031,421

(22) Filed: Feb. 21, 2011

(51) Int. Cl.
*B64C 1/00* (2006.01)

(52) U.S. Cl. .............. 244/36; 244/55; 244/45 R

(58) Field of Classification Search ......... 244/36,
244/55, 4 R, 34 R, 45 R, 218, 159.3, 12.1,
244/13, 23 R, 62, 73 R, 123.1, 119, 12.3,
244/12.5

See application file for complete search history.

(56) References Cited

U.S. PATENT DOCUMENTS

| | | |
|---|---|---|
| 1,893,129 A | 1/1933 | Charpentier |
| 2,123,096 A | 7/1938 | Charpentier |
| 2,294,367 A | 9/1942 | Flamming |
| 2,402,358 A | 6/1946 | Bauman |
| 2,406,506 A | 8/1946 | Northrop |
| 2,412,646 A | 12/1946 | Northrop |
| 2,557,962 A | 6/1951 | Greene |
| 2,616,639 A | 11/1952 | Burnell |
| 2,650,780 A | 9/1953 | Northrop |
| 2,734,701 A | 2/1956 | Horton |
| D188,079 S * | 5/1960 | Rellis ................. D12/340 |
| 3,216,673 A | 11/1965 | Alter et al. |
| 3,576,300 A * | 4/1971 | Palfreyman ........... 244/36 |
| 3,608,850 A | 9/1971 | Fredericks |
| 3,625,459 A | 12/1971 | Brown |
| 3,630,471 A | 12/1971 | Fredericks |
| 3,761,041 A | 9/1973 | Putman |
| 3,869,102 A | 3/1975 | Carroll |
| 4,149,688 A | 4/1979 | Miller, Jr. |
| 5,082,204 A | 1/1992 | Croston |
| D326,081 S | 5/1992 | Cathers et al. |
| 5,893,535 A * | 4/1999 | Hawley ................ 244/119 |
| 5,909,858 A | 6/1999 | Hawley |
| 6,098,922 A | 8/2000 | Hahl |
| D455,389 S | 4/2002 | Billington |
| 6,527,224 B2 * | 3/2003 | Seidel ................. 244/53 B |
| 6,568,632 B2 | 5/2003 | Page et al. |
| 6,578,798 B1 * | 6/2003 | Dizdarevic et al. ...... 244/199.1 |
| 6,595,466 B2 | 7/2003 | Depeige et al. |
| 6,666,406 B2 | 12/2003 | Sankrithi |
| 6,708,924 B2 | 3/2004 | Page et al. |
| 6,923,403 B1 * | 8/2005 | Dizdarevic et al. ......... 244/13 |
| 7,093,798 B2 * | 8/2006 | Whelan et al. .......... 244/120 |
| 7,793,884 B2 * | 9/2010 | Dizdarevic et al. ......... 244/36 |
| 2010/0163670 A1 * | 7/2010 | Dizdarevic et al. ......... 244/36 |

OTHER PUBLICATIONS

"Model1" French Journal: Gazette-Air & Cosmos No. 1386, Jul. 1992, p. 4 (see attachment—non-black and white drawings).
"Model2" French Journal: Gazette-Air & Cosmos No. 1386, Jul. 1992, p. 4 (see attachment—non-black and white drawings).

* cited by examiner

*Primary Examiner* — Joshua Michener

(57) ABSTRACT

The Longitudinal Flying Wing aircraft idea provides for design of large cargo and passenger aircraft in range from low to high subsonic and transonic speed. Such aircraft would have up to twice lower fuel consumption per unit of payload, higher lift capacity, and a significantly longer range, while having a significantly lower level of noise inside passenger cabin and cockpit relative to classical concept aircraft. This idea is further providing for efficient, reliable, and simple flight controls, hence it may be successfully applied for design of all-size, long range, high-lift-capacity unmanned aircraft throughout the entire range of subsonic speeds.

1 Claim, 3 Drawing Sheets

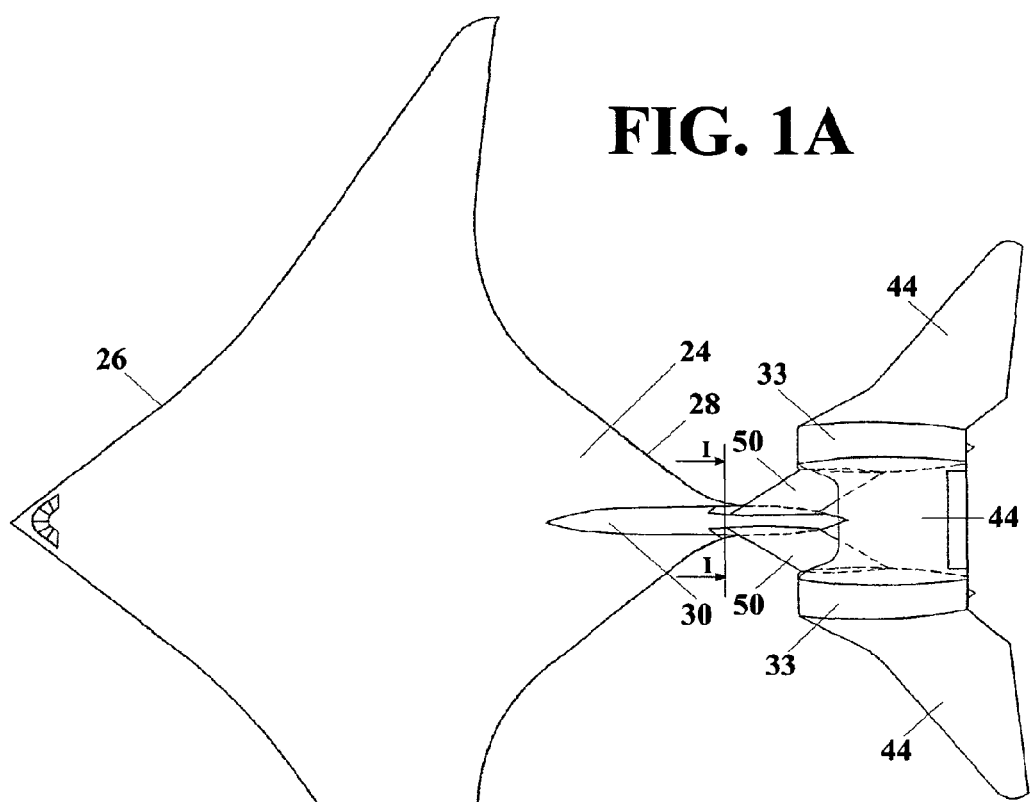
FIG. 1A
FIG. 1C
<u>CROSS-SECTION AND VIEW I - I</u>
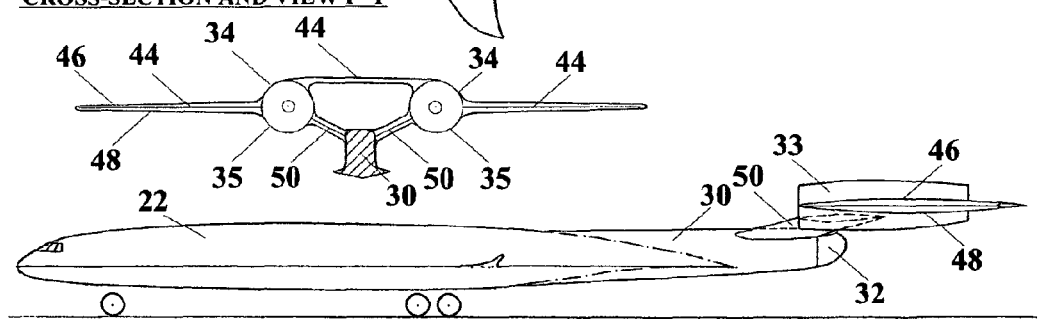
FIG. 1B

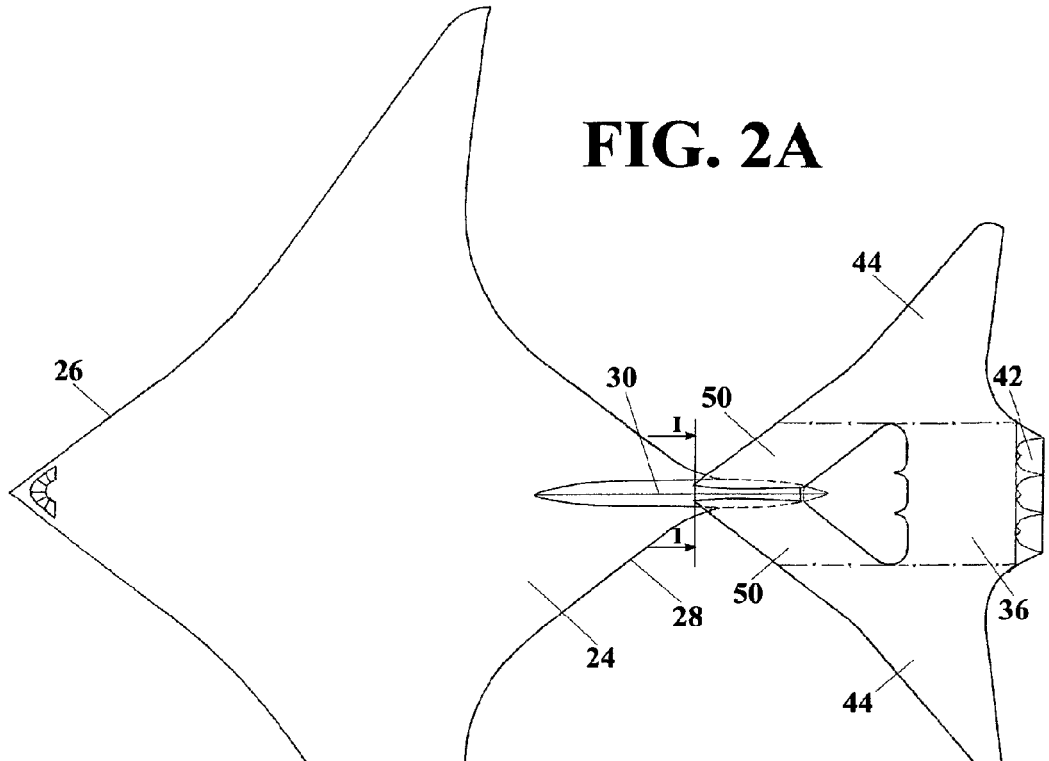
FIG. 2A
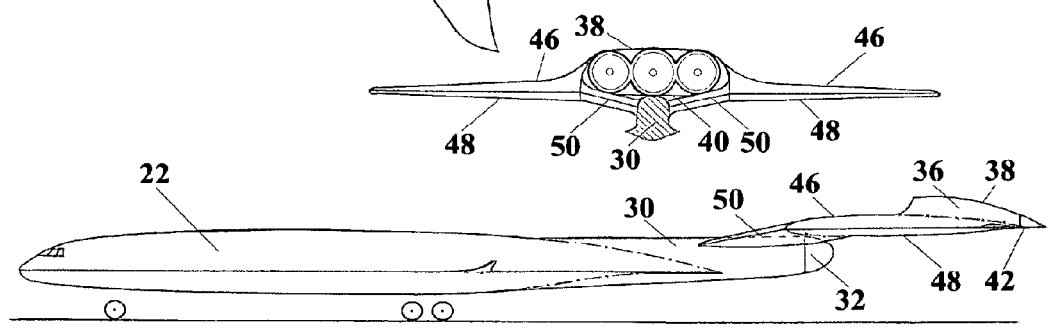
FIG. 2C
CROSS-SECTION AND VIEW I - I
FIG. 2B

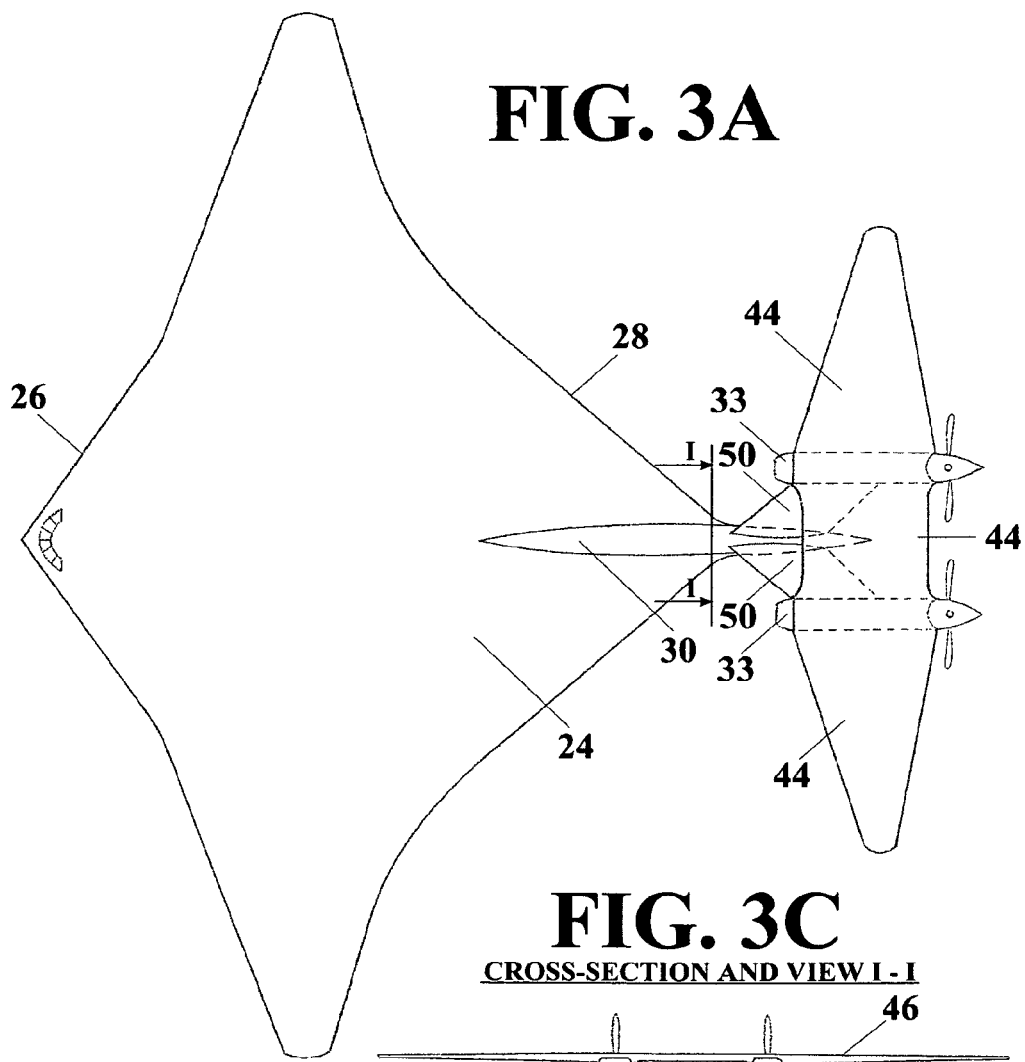
FIG. 3A
FIG. 3C
CROSS-SECTION AND VIEW I - I
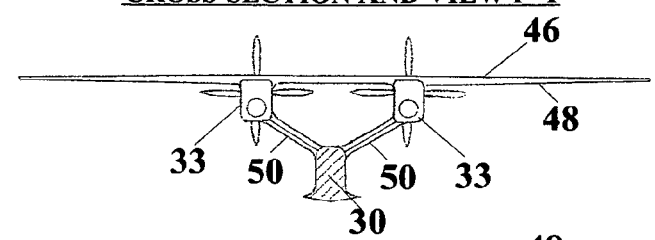
FIG. 3B
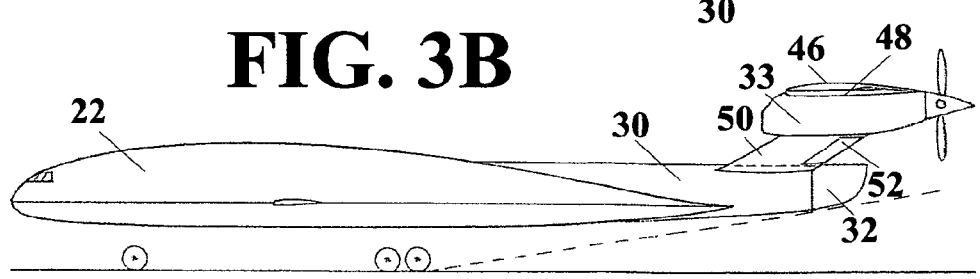

LONGITUDINAL FLYING WING AIRCRAFT

BACKGROUND OF INVENTION

This invention relates to a new aerodynamic concept of aircraft based on flying wing idea that had emerged around 80 years ago, which anticipates the elimination of all surfaces that are not generating lift in order to minimize wetted area with a simultaneous increase of airlifting area, thus increasing the lift capacity, as well as minimizing aerodynamic drag and fuel consumption of aircraft.

For the past 80 years, we have seen a large number of different ideas as to how to practically realize this idea in the most effective way. Some of the relevant ideas may be found among sited references. Unfortunately, no such idea has risen up to a sufficiently high level to meet safety requirements and official regulations for civil air transportation with competitive aerodynamic efficiencies relative to classical concept aircraft at high subsonic speeds. There have been two main obstacles that resulted with such outcome including difficulties related to attaining the efficient longitudinal stabilization and pitch control of a large airlifting body, as well as the effective accommodation of bulky payload within the airlifting body that is designed with thin efficient airfoils.

All prior art related to flying wing idea can be classified in two major groups: tailess flying wing aircraft and hybrid flying wing aircraft. Tailess flying wing aircraft have only a single integral airlifting body, which is simultaneously producing aerodynamic lift while longitudinally stabilizing itself in different flight conditions. This is an extremely ambitious goal from the flight mechanics perspective due to the fact that the above is achieved by natural fliers with the change of surface area and position of wings in all three planes, while additionally having a tailplane with the changeable area and position thereof for pitch control in various flight conditions. The integral rigid airlifting body of tailess flying wing aircraft can not meet several simultaneous and contradictory requirements including natural dynamic and static stability when the airlifting body is designed with efficient aft camber airfoils that have air pressure center shifted in aft direction while having inability to deploy trailing edge devices for extra lift production at low sped during take-off and landing due to high negative pitch momentum. Tailess flying wing aircraft are having the position of their neutral point approximately at around 25% of mean geometric chord of integral airlifting body. The gravity center of natural dynamically stable aircraft needs to be positioned in longitudinal direction in front of neutral point. This consequently requires the integral airlifting body to be defined with low efficient reflex airfoils that have air pressure center shifted in front of 25% of airfoil chord to satisfy the static stability of aircraft in cruising conditions when trailing edge devices for aerodynamic lift regulation being in the neutral position. The low aerodynamic efficiency of such aircraft is especially pronounced at high subsonic and transonic speeds. If the integral airlifting body of a tailess flying wing aircraft was designed with efficient aft camber airfoils, the aircraft gravity center would need to be shifted in aft direction behind the neutral point in order to satisfy the static stability of aircraft when trailing edge devices for aerodynamic lift regulation being in their neutral position, thus such aircraft being naturally dynamically unstable, hence not satisfying safety regulations for civil air transportation.

In both cases, trailing edge devices for extra lift production can not be used due to a high negative pitch momentum that would be generated, hence requiring a high attack angle during approach to the airport and landing phase, thus additionally jeopardizing the flight safety and ride quality of such aircraft.

Military bomber B-2 is an example of a dynamically unstable tailess flying wing aircraft that has been fully developed so far though at extremely high production cost with limited range and speed, as well as low flight safety, all of which are the reasons for a low number of units that have been manufactured.

The Blended Wing Body aircraft is one of the most recent attempts to apply tailess flying wing concept to civil applications. Intensive research over the past 15 years that has involved a significant number of experts in the areas of theoretical and applied aerodynamics, as well as computational analysis and wind tunnel testing have not produced a desirable outcome to simultaneously satisfy a required level of flight safety and competitive aerodynamic efficiency for civil air transportation at high subsonic speeds.

Hybrid flying wing concepts assume the aircraft with two or more airlifting bodies that are mutually linked by aerodynamically shaped rigid connecting bodies. They further anticipated the accommodation of the payload within such airlifting bodies. These concepts are more flexible for aerodynamic optimization than tailess flying wing concepts. Hybrid flying wing concepts usually anticipate front and rear airlifting bodies. Front airlifting bodies are larger and except for lift production additionally providing for an inner space for payload accommodation. Rear airlifting bodies are used for longitudinal stabilization of aircraft, while providing for efficient pitch control and additional lift production. Rigid connected bodies may have other functions related to the flight control of an aircraft. There are a number of ideas and patents related to the hybrid versions of flying wing idea some of which are cited as references in this patent application. The most recent attempt for the affirmation of the hybrid fling wing concept has been presented in U.S. Pat. Nos. 6,923,403 and 7,793,884.

The "Tailed Flying Wing Aircraft" idea as outlined in U.S. Pat. No. 6,923,403 reflects a large front airlifting body with a semi-elliptical aft extension of the central trailing edge, whereby the upper section of the aerodynamic covers of jet engines is structurally directly integrated with the upper side of the airframe of the airlifting body in such a way that the upper surface of the airlifting body is enveloping the jet engine airintake on the lower side thereof. The tailplane as the rear airlifting and stabilizing body is connected to the front airlifting body either directly via the airframe of jet engine covers or by means of fin with rudder while being fastened to the jet engine cover. However, both solutions can not provide for a sufficient distance of the tailplane behind the large front airlifting body to allow for the application of efficient aft camber airfoil on the front airlifting body with a reasonable surface area of the tailplane due to a large semi-elliptical aft section of the front airlifting body that does not shift enough jet engine covers with stabilizing surfaces in aft direction, while simultaneously significantly increasing the area of the front airlifting body, which needs to be longitudinally stabilized. In addition, the thick turbulent boundary layer over the upper surface of the front airlifting body in front of jet engine air intake is significantly reducing the jet engine efficiency of the "Tailed Flying Wing Aircraft" when compared with the efficiency of the jet engines of classical concept aircraft, which are positioned in front of wings, hence encountering a free and undisturbed airflow.

The "T-tailed Deltoid Main Wing Aircraft" idea as outlined in U.S. Pat. No. 7,793,884 reflects a number of improvements relative to "Tailed Flying Wing Aircraft" concept. A deltoid shape of the rear portion of the central section of front airlifting body that is defined with a straight trailing edge is strengthened with an aerodynamically shaped extended vertical aft reinforcement, whose fin with a tailplane on the top thereof is fastened thereto, hence resulting with a much longer distance of the tailplane aft of the front airlifting body with a smaller airlifting area thereof when compared to "Tailed Flying Wing Aircraft" with the same payload capacity. This configuration provides for the static stability of "T-tailed Deltoid Main Wing Aircraft" in cruising conditions when the front airlifting body and tailplane are designed with efficient aft-camber airfoils, while having a relatively small wetted area and low negative aerodynamic loading of the tailplane. Additionally, jet engines with air intake are positioned above the upper surface of the front airlifting body via jet engine pylons to avoid the turbulent boundary layer of the front airlifting body. However, still a large wetted area of the tailplane when compared to classical concept aircraft, which does not produce lift or producing even a small amount of negative lift, as well as the parasite wetted area of fin with rudder and jet engine pylons with nacelles that are not contributing to lift production or longitudinal stabilization of aircraft may not be resulting with overwhelming advantages of flying wing idea over the classical concept aircraft with fuselage at high subsonic speeds.

BRIEF SUMMARY OF INVENTION

The "Longitudinal Flying Wing Aircraft" idea provides for the following applications and advantages:
  a) an opportunity to design and produce large, high-lift-capacity, long-range, high-subsonic, and transonic hybrid flying wing aircraft that are having a natural longitudinal stability required for commercial passenger and cargo transport with airlifting bodies that are defined with efficient aft-camber airfoils.
  b) an opportunity to design and produce large, high-lift-capacity, long-range, high-subsonic, and transonic manned hybrid flying wing aircraft for military purposes with a low visual, radar, and infra-red reflection that are having a natural longitudinal stability when airlifting bodies are defined with efficient aft-camber airfoils
  c) an opportunity to design and produce all-size and purpose long-range, high-lift-capacity unmanned hybrid flying wing aircraft that have natural longitudinal stability, as well as reliable, efficient, and simple flight controls.
  d) a substantially lower fuel consumption per unit of payload when compared to classical concept aircraft with fuselage, as well as tailess and tailed flying wing prior art aircraft.
  e) a substantially higher lift capacity and range when compared to classical concept aircraft, as well as tailess and tailed flying wing prior art aircraft.
  f) a substantially higher economical cruising speed than classical concept aircraft, as well as tailess and tailed flying wing prior art aircraft.

Accordingly, besides the objects and advantages of the prior art described above in our patent application, the several objects and advantages of the "Longitudinal Flying Wing Aircraft invention are:
  a) the reduction of wetted area to the highest degree possible of all necessary outer aircraft surfaces that are neither producing lift nor naturally stabilizing aircraft in longitudinal direction:
  b) the shift of all necessary outer aircraft surfaces that are not producing lift in aft direction behind aircraft gravity center to the highest extent possible, while the same being shaped and integrated with other airlifting bodies in such a way to achieve the highest possible aerodynamic reflection thereof in order to increase the natural longitudinal dynamic stability of Longitudinal Flying Wing aircraft.

Still further objects and advantages will become apparent from a consideration of ensuing description and drawings. Although description contains many specifics, they should not be construed as limiting the scope of the invention but merely providing illustrations for some of the presently preferred embodiments of the invention. Therefore, the scope of the invention should be determined by the appended claims and their legal equivalents rather than by given examples.

SHORT DESCRIPTION OF DRAWINGS

FIGS. 1A, 1B, and 1C show a Longitudinal Flying Wing jet aircraft that is powered by two lateral jet engines whose each aerodynamic cover is integrated on both lateral sides thereof with rear wings, thus forming an integral rear aerodynamic body for natural longitudinal stabilization. The integral rear aerodynamic body is joined front wings on the upper side thereof by a "V" shaped tail whose upper ends are fastened to the aerodynamic covers of lateral jet engines, while the lower side of V-tail is integrated with the central vertical rear reinforcement of front wings.

FIGS. 2A, 2B, and 2C show a Longitudinal Flying Wing jet aircraft that is powered by three side-by-side central jet engines that have one integral aerodynamic cover that is integrated with the rear portion of the left and right section of rear wings between thereof, thus forming an integral aerodynamic rear body for natural longitudinal stabilization. The rear integral aerodynamic body is joined front wings on the upper side thereof by a V-tail whose upper ends are integrated with the front portion of the left and right sections of rear wings in front of integral aerodynamic cover, while the lower side of V-tail is integrated with the central vertical rear reinforcement of front wings. The aft extended lower section of the integral aerodynamic cover is pivotal around the transversal axis, thus being a pitch control surface.

FIGS. 3A, 3B, and 3C show a Longitudinal Flying Wing turboprop aircraft that is powered by two lateral turboprop engines whose each aerodynamic cover is integrated with rear wings on both lateral sides thereof, thus forming an integral aerodynamic rear body for natural longitudinal stabilization. The rear integral aerodynamic body is joined front wings on the upper side thereof by a V-tail whose upper ends are fastened to the aerodynamic covers of lateral turboprop engines, while the lower side of the V-tail is integrated with the central vertical rear reinforcement of front wings.

REFERENCE NUMERALS IN DRAWINGS

22—front wing
24—front wing central section
26—central section leading edge
28—central section trailing edge
30—central section aft reinforcement
32—vertical rudder of aft reinforcement
33—single engine aerodynamic cover
34—single aerodynamic cover upper surface
35—single aerodynamic cover lower surface
36—integral aerodynamic cover of jet engines
38—integral aerodynamic cover upper surface
40—integral aerodynamic cover lower surface 42—aft extension of integral aerodynamic cover lower surface
44—rear wings
46—rear wings upper surface
48—rear wings lower surface
50—V-tail
52—inclined rudders of V-tail

DETAILED DESCRIPTION OF INVENTION

FIG. 1 shows a Longitudinal Flying Wing jet aircraft that is powered by two lateral jet engines. The Longitudinal Flying Wing aircraft as shown in FIG. I is composed of front wing (22), two lateral jet engines with rigid aerodynamic covers thereof (33), rear wings (44), and V-tail (50). Front wing (22) is the largest aerodynamic body of the Longitudinal Flying Wing aircraft that is providing for the highest amount of aerodynamic lift, while carrying the largest amount of fuel. Front wing central section (24), which is having the longest chord is housing bulky payload, cockpit, and landing gears. Fronts wing central section (24) is having vertical aft reinforcement (30) that is aerodynamically shaped in airflow direction and extending far behind mean geometric chord of front wing (22). V-tail (50) which carries rear wings (44), jet engines, and jet engine aerodynamic covers (33) is fastened on its bottom to the rear portion of vertical aft reinforcement (30). The airframes of aft reinforcement (30) and rear portion of the central section (24) are designed as an integral body with high bending resistance that is capable of transferring all aerodynamic and inertia forces of V-tail (50), jet engines with aerodynamic covers (33), and rear wings (44) into the main airframe of front wing (22) with low weight of the airframe of the rear portion of central section (24). Central section leading edge (26) and central section trailing edge (28) are defined with straight lines. Central section leading edge (26) has a high sweepback angle adjusted for high subsonic and transonic speeds. Central section trailing edge (28) has a high forward sweep angle in order to provide for a long chord and low relative thickness of airfoils of central section (24) around aircraft symmetry plane where bulky payload is situated, while simultaneously shifting the rear portion of aft reinforcement (30) to which V-tail (50) with rear wings (44) and aerodynamic covers (33) are fastened in aft direction far behind mean geometric chord of front wing (22). Front wing (22) across the span thereof is designed with efficient aft camber airfoils.

Jet engines with aerodynamic covers (33) that include aerodynamically shaped jet engine air intake are set in free airflow above the turbulent boundary layer of front wing (22) far behind aircraft gravity center in order to provide for a high jet engine efficiency, while aerodynamic covers (33) having a high contribution to natural longitudinal stabilization of Longitudinal Flying Wing aircraft. Lateral sides of aerodynamic cover upper surfaces (34) and aerodynamic cover low surfaces (35) are aerodynamically integrated with rear wings upper surfaces (46) and rear wing lower surfaces (48) respectfully, hence the airflow slip from lower to upper sides of aerodynamic covers (33) and reversely around lateral sides thereof is prevented, thus consequently the aerodynamic reflection of aerodynamic covers (33) for longitudinal natural stabilization of the Longitudinal Flying Wing aircraft being significantly increased. Aerodynamic covers (33) have a rigid airframe to which jet engines are fastened. The airframes of aerodynamic covers (33) are designed similarly as the airframe of the fuselage of classical concept aircraft in order to successfully transfer the inertia forces of engines, as well as the aerodynamic and inertia forces of aerodynamic covers (33) and rear wings (44) into the airframe of V-tail (50). Aerodynamically integrated aerodynamic covers (33) and rear wings (44) are acting as a very efficient integral aerodynamic body for natural aerodynamic stabilization of Longitudinal Flying Wing aircraft. V-tail (50) is fastened to aerodynamic covers (33) on the top side thereof. V-tail (50) as shown in FIG. 1 is having a high sweepback angle in order to shift aerodynamic covers (33) with rear wings (44) in aft direction behind mean geometric chord of front wing (22) and aircraft gravity center as much as possible, hence consequently increasing the natural aerodynamic longitudinal stability of the aircraft. Dihedral angle of V-tail (50) is allowing for the jet engine airintake of aerodynamic covers (33) to be set in free airflow over the turbulent airflow behind front wing (22), while simultaneously resulting with the highest possible horizontal projection and the lowest possible wetted area of V-tail (50) in order to increase the aerodynamic reflection for natural longitudinal aerodynamic stabilization of V-tail (50) that is positioned at the long distance aft of aircraft gravity center. The airframe of V-tail (50) is designed to be able to transfer the inertia forces of jet engines, as well as all aerodynamic and inertia forces of rear wings (44) and jet engines aerodynamic covers (33) into the airframe of aft reinforcement (30) of central section (24).

The aircraft concept that is defined in such way belongs to hybrid flying wing aircraft concepts. The original flying wing aircraft concepts anticipated to have only one rigid airlifting body in order to eliminate the parasitic wetted area of aircraft that are not producing aerodynamic lift in order to consequently minimize fuel consumption per unit of payload. However, detailed analyses over a long period of over 80 years showed that a single rigid airlifting body cannot respond to all very complex and opposing requirements of flight mechanics to give a chance to the aircraft with a single rigid body to be competitive with classical concept aircraft with fuselage and tail. The main obstacle is related to the low natural longitudinal aerodynamic stability of the aircraft with a single rigid airlifting body regardless of its shape. Hybrid flying wing concepts anticipated a front large airlifting body inside which bulky payload and cockpit are accommodated, while a large parasitic wetted area of fuselage of classical concept aircraft is therefore eliminated. Unlike original flying wing concept aircraft, hybrid flying wing concept aircraft have at least one additional aerodynamic body with a high aerodynamic reflection in vertical direction behind aircraft gravity center similar to the tailplane of classical concept aircraft in order to increase the natural longitudinal aerodynamic stability of such aircraft. The contribution of the rear stabilizing aerodynamic body in natural longitudinal stabilization depends on its shape, aerodynamic surface area, and the distance from the aircraft gravity center. The additional aerodynamic rear surface area is automatically increasing the wetted area of aircraft, hence the main objective of hybrid flying wing concepts is directed towards increasing the distance of rear stabilizing aerodynamic body relative to the front airlifting body with the smallest possible increase of the total wetted area of aircraft. The typical examples of such hybrid flying wing aircraft are "Tailed Flying Wing Aircraft" as anticipated in U.S. Pat. No. 6,923,403 and "T-tailed Deltoid Main Wins Aircraft" in U.S. Pat. No. 7,793,884. Detailed and versatile analyses showed that T-tailed Deltoid Main Wing aircraft as illustrated in U.S. Pat. No. 7,793,884 is providing for lower fuel consumption than Tailed Flying Wing aircraft as illustrated in U.S. Pat. No. 6,923,403 due to higher engine efficiency as being positioned over the turbulent airflow of front aerodynamic body, as well as a longer distance of tailplane from aircraft gravity center and lower wetted and airlifting area of front airlifting body for the same payload capacity. However, still a large wetted area of aerodynamic covers and pylons of jet engines, as well as the wetted area of large vertical aerodynamic surfaces of fin with rudder that are neither producing lift nor longitudinally significantly stabilizing aircraft are decreasing the total aerodynamic efficiency of T-tailed Deltoid Main Wing aircraft. Longitudinal Flying Wing aircraft concept as shown in FIG. 1 is offering new conceptual solutions that are decreasing the total wetted area of aircraft, while simultaneously significantly increasing the natural longitudinal aerodynamic stability and lift capacity of Longitudinal Flying Wing aircraft when compared to T-tailed Deltoid Main Wing aircraft. Namely, aerodynamic covers (33) are significantly shifted in aft direction behind front airlifting body when compared to jet engine nacelles of T-tailed Deltoid Main Wing aircraft that are positioned laterally from the rear section of airlifting body. On the other hand, aerodynamic covers (33) of Longitudinal Flying Wing Aircraft are aerodynamically integrated on their lateral sides with sections of rear wing (44), thus preventing the airflow slip around lateral sides of aerodynamic covers (33), thereby a significant shift of aerodynamic covers in aft direction and prevention of lateral airflow slip are transforming aerodynamic covers (33) into a highly efficient aerodynamic body for natural aerodynamic longitudinal stabilization of longitudinal flying wing aircraft as shown in FIG. 1.

Additionally, vertical jet engine pylons of T-tailed Deltoid Main Wing aircraft are substituted with V-tail (50) which together with aerodynamic covers (33) and central section of rear wing (44) is forming a strong integral airframe as shown in FIG. 1 that is capable of transferring all aerodynamic and inertia forces of jet engines, aerodynamic covers (33), and rear wings (44) into aft central reinforcement (30) with a low weight of the airframe of aerodynamic covers (33), rear wings (44), and V-tail (50), while the horizontal projection of V-tail (50) is acting as a very efficient additional aerodynamic surface for natural longitudinal aerodynamic stabilization of Longitudinal Flying Wing aircraft, whereas the substitution of jet engine pylons and the elimination of large upper section of fin with rudder of T-tailed Deltoid Main Wing aircraft are significantly reducing the total wetted area of Longitudinal Flying Wing aircraft when compared to T-tailed Deltoid Main Wing aircraft.

The significant increase of natural longitudinal aerodynamic stability of Longitudinal Flying Wing aircraft as shown in FIG. 1 when compared to T-tailed Deltoid Main Wing aircraft as the result of integration of aerodynamic covers (33) with rear wings (44) and due to horizontal projection of V-tail (50) is significantly shifting the neutral point of Longitudinal Flying Wins aircraft in aft direction along mean geometric chord of front wing (22), thus allowing the shift of aircraft gravity center in aft direction with the same positive static margin when compared to T-tailed Deltoid Main Wing aircraft, thus consequently providing for a significant involvement of rear wings (44) in positive airlift production in cruising configuration.

A possibility to generate a positive lift on rear wings (44) is significantly increasing the lift capacity of Longitudinal Flying Wing aircraft when compared to T-tailed Deltoid Main Wins aircraft and consequently increasing the aerodynamic efficiency of Longitudinal Flying Wing aircraft as shown in FIG. 1.

Additionally, the positive lift of rear wings (44) is reducing the loading of the airframe of central section (24) from the inertia forces of jet engines including the airframe of rear wings (44), aerodynamic covers (33), V-tail (50), and aft reinforcement (30) in cruising configuration thereby reducing the weight of V-tail (50), aft reinforcement (30), and the rear portion of front central section (24), thus consequently additionally increasing the aerodynamic efficiency or Longitudinal Flying Wing aircraft when compared to T-tailed Deltoid Main Wing aircraft.

FIG. 2 shows a different way of integration of aerodynamic covers (33) with rear wings (44), as well as a different way of connecting of rear wings (44) and aerodynamic covers (33) with V-tail (50).

Longitudinal Flying Wing aircraft as shown in FIG. 2 is powered by three central jet engines that are arranged side by side in transversal direction next to each other.

All three central jet engines are covered with one integral aerodynamic cover (36), which it composed of aerodynamic cover upper surface (38) and aerodynamic cover lower surface (40). Jet engines with integral aerodynamic cover (36), which is inserted between the left and right section of rear wings (44) is shifted in aft direction to the highest degree possible along the root airfoils of left and right section of rear wings (44). The airframe of integral aerodynamic cover (36) including the aerodynamic cover upper surface (38) and lower surface (40) is aerodynamically and structurally integrated with the airframe of rear portion of left and right section of rear wings (44) including rear wings upper surface (46) and lower surface (48), thereby forming an integral aerodynamic body for natural aerodynamic longitudinal stabilization of Longitudinal Flying Wing aircraft with free front inboard ends of left and right section of rear wings (44) in front of integral aerodynamic cover (36). The front inboard ends of left and right section of rear wings (44) in front of integral aerodynamic coves (36) are further aerodynamically and structurally integrated with upper ends of V-tail (50), while lower ends of V-tail (50) are fastened to aft reinforcement (30) of central section (24), thereby forming a rigid aerodynamic body of Longitudinal Flying Wing aircraft as shown in FIG. 2.

The integration of integral aerodynamic cover (36) with rear wings (44) is performed in such way that aerodynamic cover lower surface (40) is positioned approximately at the same vertical level as rear wings lower surface (48) in integration area, while aerodynamic cover upper surface (38) is at a higher vertical level than rear wings upper surface (46), thus requiring transitional sections in transversal direction on both sides of integral aerodynamic cover (36) to result with a smooth aerodynamic integration of aerodynamic cover upper surface (38) and rear wings upper surface (46) in transversal direction. Such mutual vertical position of integral aerodynamic cover (36) and rear wings (44) is resulting with the longitudinal axes of jet engines being lifted up relative to the chord plane of rear wings (44), hence avoiding the negative influence of V-tail (50), which is positioned in front of jet engine air intakes on jet engine efficiency when the dihedral angle of V-tail (50) has a relatively low angle.

The dihedral angle of V-tail (50) is optimized to avoid the negative influence of turbulent airflow behind front wings (22) and V-tail (50) on jet engine airintake of integral aerodynamic covet (36) but simultaneously minimizing the wetted area of V-tail (50), as well as the interference drag between V-tail (50) and rear wings (44).

Lower pivotal aft extension (42) of aerodynamic cover lower surface (40) of integral aerodynamic cover (36) with a horizontal axis of rotation in transverse direction is extending behind jet engine exhausts, thus deflecting the noise of jet exhaust in upward direction, thereby reducing the level of noise in the vicinity of airports. The deflection of lower pivotal aft extension (42) is changing the thrust vector of jet engines in vertical direction, thus acting as a central pitch control surface with high efficiency especially at low speed when aerodynamic elevators of rear wings (44) are having a lower efficiency.

The solution for central integral aerodynamic cover (36) of Longitudinal Flying Wing aircraft shown in FIG. 2 is providing for many advantages over the solution with a single lateral aerodynamic covers (33) of Longitudinal Flying Wing aircraft from FIG. 1 as follows:

1. Wide plates of aerodynamic cover lower surface (40) of integral aerodynamic cover (36) that are flat in transversal direction and shaped in airflow direction as rear wings low surface (48), as well as the plates of aerodynamic cover upper surface (38) of integral aerodynamic cover (36) that are slightly curved on their lateral sides in transversal direction and shaped in airflow direction similarly as rear wings upper surface (46) of Longitudinal Flying Wing aircraft as shown in FIG. 2 are having a much higher aerodynamic reflection for the purpose of natural aerodynamic longitudinal aircraft stabilization than circular shapes of aerodynamic covers (33) of Longitudinal Flying Wing aircraft as shown in FIG. 1.
2. A wide straight plate of lower aft extension (42) of aerodynamic cover lower surface (40) of Longitudinal Flying Wing aircraft as shown in FIG. 2 is an additional aerodynamic surface with a very long distance behind aircraft gravity center that is significant additionally increasing the natural longitudinal aerodynamic stability of Longitudinal Flying Wing aircraft as shown in FIG. 2 when compared to Longitudinal Flying Wing aircraft that is shown in FIG. 1.
3. A significantly longer distance of central integral aerodynamic cover (36) in aft directing relative to V-tail (50) that is fastened to aft reinforcement (30) of central section (24) of Longitudinal Flying Wing aircraft as shown in FIG. 2 when compared to the distance of aerodynamic covers (33) relative to V-tail (50) of Longitudinal Flying Wing aircraft in aft direction as shown in FIG. 1 is additionally increasing the natural longitudinal aerodynamic stability of Longitudinal Flying Wing aircraft as shown in FIG. 2 when compared to Longitudinal Flying Wing aircraft from FIG. 1.
4. Significantly lower interference drag between rear wings (44) and central integral aerodynamic cover (36) of Longitudinal Flying Wing aircraft as shown in FIG. 2 when compared to the interference drag of lateral aerodynamic covers (33) and rear wings (44) of Longitudinal Flying Wing aircraft as shown in FIG. 1 is due to aerodynamic cover lower surface (40) and rear wings lower surface (48) of Longitudinal Flying Wing aircraft as shown in FIG. 2 being integrated as a unique smooth integral lower surface without any steps in longitudinal and transversal directions, as well as aerodynamic cover upper surface (38), which is smoothly integrated in transversal direction with only rear wings upper surface (46) at two lateral sides of central aerodynamic cover (36), while two separate single aerodynamic covers (33) of Longitudinal Flying Wing aircraft as, shown in FIG. 1 with circular shapes thereof being integrated with the central section, as well as both lateral sections of rear wings (44) along four longitudinal connecting sides with angles between circular surfaces of aerodynamic covers (33) and the surfaces of central and lateral sections of rear wings (44) being close to 90°.
5. The front portions of left and right sections of rear wings (44) and V-tail (50) with low dihedral angle under 30° are acting together as a unique and slightly bent aerodynamic surface of Longitudinal Flying Wing aircraft as shown in FIG. 2, hence generating significantly lower interference drag when compared to the interference drag between V-tail (50) and lateral circular single aerodynamic covers (33) of Longitudinal Flying Wing aircraft as shown in FIG. 1.
6. The interference drag of Longitudinal Flying Wing aircraft as shown in FIG. 1 is additionally increased relative to the interference drag of Longitudinal Flying Wing aircraft as shown in FIG. 2 due to additional aerodynamic interaction between aerodynamic surfaces of V-tail (50) and the aerodynamic surface of the central section of rear wings (44) of Longitudinal Flying Wing aircraft as shown in FIG. 1, which are positioned directly over the aerodynamic surfaces of V-tail (50) and connected to the inboard sides of aerodynamic covers (33) close to each other in longitudinal and vertical direction as shown in FIG. 1.

The only advantage of Longitudinal Flying Wing aircraft as shown in FIG. 1 that has two separate lateral aerodynamic covers (33) relative to the Longitudinal Flying Wing aircraft as shown in FIG. 2 with the integral central aerodynamic cover (36) relates to a possibility to create two separate jet engine air intakes with full circular shapes that are set independently in free airflow as shown in FIG. 1 similarly as it is the case with classical concept passenger aircraft, while air intakes of outboard engines of Longitudinal Flying Wing aircraft as shown in FIG. 2 on its outboard ends are having forward extensions that are integrated with inboard ends of front portions of left and right sections of rear wings (44), thus decreasing the aerodynamic efficiency of air intakes of outboard jet engines of Longitudinal Flying Wing aircraft as shown in FIG. 2 when compared to circular airintakes set in free airflow of Longitudinal Flying Wing aircraft as shown in FIG. 1.

FIG. 3 shows a turboprop Longitudinal Flying Wing aircraft that is driven by two lateral turboprop engines with pusher propellers. This concept is offering a similar solution of integration of rear wings (44) with aerodynamic covers (33) and a join between aerodynamic covers (33) and V-tail (50) as being the case with Longitudinal Flying Wing aircraft as shown in FIG. 1. The main difference is related to the substitution of jet engines with turboprop engines. This difference is ultimately changing the shape of planforms of front wings (22), rear wings (44) and aerodynamic covers (33), as well as changing airfoils of front wings (22) and rear wins (44) due to speed limitations for aircraft with turboprop engines when compared to aircraft with jet engines. A significantly lower cruising speed of turbo-prop aircraft is allowing for the application of reflex airfoils that have air pressure center shifted forward up to 20% of the airfoil chord with much lower negative consequences related to increased drag of aircraft while forwardly shifted air pressure center is allowing for a much higher involvement of rear wings (44) in aerodynamic lift production, thus increasing the lift capacity of such aircraft. A high lift capacity of turbo-prop Longitudinal Flying Wing aircraft is preferable for cargo, tanker, as well as firefighting applications. Turboprop Longitudinal Flying Wing aircraft without fuselage and with engines shifted far behind passenger cabin can be also very favorable for mass regional passenger transportation relative to turboprop classical concept regional passenger aircraft due to much lower fuel consumption and level of noise inside the passenger cabin, while having approximately the same level of flight safety.

The outermost aft position of turbo-prop engines with a large propeller diameter requires a higher dihedral angle of V-tail (50) relative to dihedral angle of jet Longitudinal Flying Wing aircraft in order to avoid damage of propellers during takeoff and landing. The higher dihedral angle is providing for a higher involvement of V-tail (50) in directional control of aircraft. Therefore, inclined rudders (52) are installed on the trailing edge of V-tail (50) to help vertical rudder (32) to maintain directional stability of aircraft at very low speeds during emergency landing when one engine is shut down.

We claim:

1. A longitudinal flying wing aircraft having a symmetry plane, said symmetry plane including a longitudinal axis, said longitudinal axis coinciding with airflow direction, said longitudinal flying wing aircraft comprising:
   a. front and rear airlifting surfaces, said front and rear airlifting surfaces being set in free airflow, said front and rear airlifting surfaces being mutually arranged along said longitudinal axis, said front and rear airlifting surfaces providing for the aerodynamic lift of said longitudinal flying wing aircraft, said rear airlifting surfaces being arranged behind the gravity center of said longitudinal flying wing aircraft, thus increasing the natural longitudinal dynamic stability of said longitudinal flying wing aircraft with a predetermined size and shape of said front and rear airlifting surfaces,
   b. means for thrust production, said means for thrust production including a plurality of aircraft engines, said aircraft engines having aerodynamic covers, said aerodynamic covers with said aircraft engines being set in free airflow behind said gravity center, the free lateral ends of said aerodynamic covers being aerodynamically and structurally integrated with said rear airlifting surfaces into a rigid rear integral aerodynamic body in order to prevent the airflow slip around said free lateral ends, hence increasing the aerodynamic reflection of said aerodynamic covers for natural longitudinal dynamic stabilization, thus said aerodynamic covers additionally increasing said natural longitudinal dynamic stability of said longitudinal flying wing aircraft,
   c. connecting means, said connecting means joining together said front airlifting surfaces and said rigid rear integral aerodynamic body, thus forming a rigid body of said longitudinal flying wing aircraft, said connecting means being shifted along said front airlifting surfaces behind said gravity center to the outermost aft position thereof, said connecting means being shaped as aerodynamic surfaces by airfoils in airflow direction, said aerodynamic surfaces of said connecting means having a sweepback angle, said aerodynamic surfaces of said connecting means being tilted from said symmetry plane in order to result with the increased horizontal projection thereof, said outermost aft position behind said gravity center, said sweepback angle, and said increased horizontal projection of said aerodynamic surfaces of said connecting means providing for the increased contribution of said connecting means to said natural longitudinal dynamic stability, whereas said outermost aft position behind said gravity center and said sweepback angle of said connecting means providing for the highest possible contribution of said rigid rear integral aerodynamic body to said natural longitudinal dynamic stability with said predetermined size and shape of said front and rear airlifting surfaces, whereby said increased contribution of said connecting means and said highest possible contribution of said rear integral aerodynamic body to said natural longitudinal dynamic stability with said predetermined size and shape of said front and rear airlifting surfaces are resulting with the shift of the neutral point of said longitudinal flying wing aircraft substantially behind the mid-point of the mean geometric chord of said front airlifting surfaces, said shift of said neutral point and the position of said gravity center in front of said neutral point with a positive static margin providing for the natural longitudinal dynamic and static stability of said longitudinal flying wing aircraft in cruising flight configurations with a full deployment of said front airlifting surfaces and a substantial deployment of said rear airlifting surfaces to generate positive aerodynamic lift, whereas further said full deployment of said front airlifting surfaces and said substantial deployment of said rear airlifting surfaces providing for a high ratio between the airlifting and wetted area of said longitudinal flying wing aircraft.

* * * * *